United States Patent
Hendershot et al.

(10) Patent No.: US 7,534,960 B2
(45) Date of Patent: May 19, 2009

(54) CABLE STUFFING TUBE

(75) Inventors: Aaron K. Hendershot, Webster, NY (US); Donald B. Butterbaugh, Macedon, NY (US); Wayne R. Bessell, Canandaigua, NY (US)

(73) Assignee: Harris Corporation, Melbourne, FL (US)

( * ) Notice: Subject to any disclaimer, the term of this patent is extended or adjusted under 35 U.S.C. 154(b) by 277 days.

(21) Appl. No.: 11/358,985

(22) Filed: Feb. 22, 2006

(65) Prior Publication Data

US 2007/0193766 A1    Aug. 23, 2007

(51) Int. Cl.
    *H02G 15/04* (2006.01)
(52) U.S. Cl. ..................... 174/77 R; 174/93
(58) Field of Classification Search ............ 174/93, 174/77 R
    See application file for complete search history.

(56) References Cited

U.S. PATENT DOCUMENTS

| | | | | |
|---|---|---|---|---|
| 1,851,940 A | * | 3/1932 | Williams | 138/89 |
| 3,772,637 A | * | 11/1973 | Paullus et al. | 439/589 |
| 5,235,138 A | * | 8/1993 | Shah et al. | 174/151 |
| 5,545,852 A | * | 8/1996 | Boscher et al. | 174/84 R |
| 6,180,882 B1 | * | 1/2001 | Dinh | 174/655 |
| 6,521,840 B1 | * | 2/2003 | Kreutz | 174/151 |

* cited by examiner

*Primary Examiner*—Chau N Nguyen
(74) *Attorney, Agent, or Firm*—Darby & Darby; Robert J. Sacco

(57) ABSTRACT

The invention relates to an improved stuffing tube assembly (100) and method for traversing a bulkhead with a cable. The stuffing tube assembly (100) can accommodate a plurality of cables of varying cross-sectional areas. The improved stuffing tube (100) can also allow cables to pass through the stuffing tube (100) without having to remove and/or resolder the cables' end connectors. The invention can include a resilient material that is positioned between two opposing flanges (407, 413). A cable bore (112) can define an opening extending through the resilient material. A compression device can include a system of opposing flanges (407, 413). When the compression device selectively applies a compressive force to the resilient material, the distance between the opposing flanges (407, 413) can be varied. The compressive force can vary the cross-sectional profile of the cable bore (112) such that the cross-sectional profile of the cable bore (112) engages a peripheral portion of the cable where the cable passes through the cable bore (112).

31 Claims, 3 Drawing Sheets

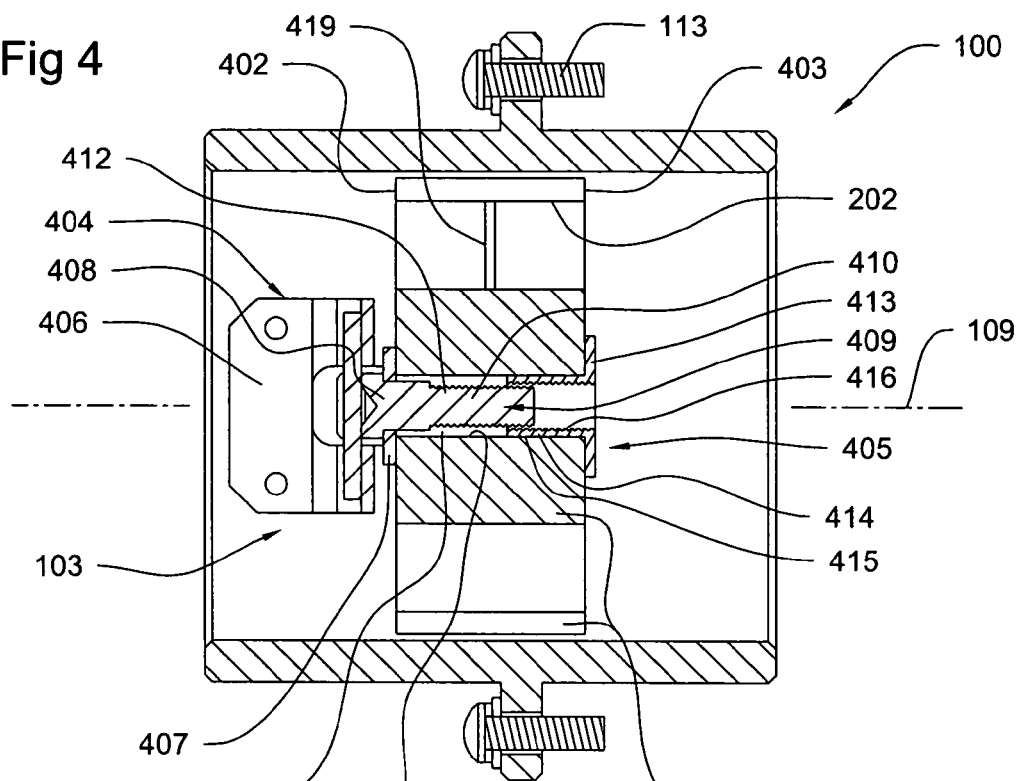
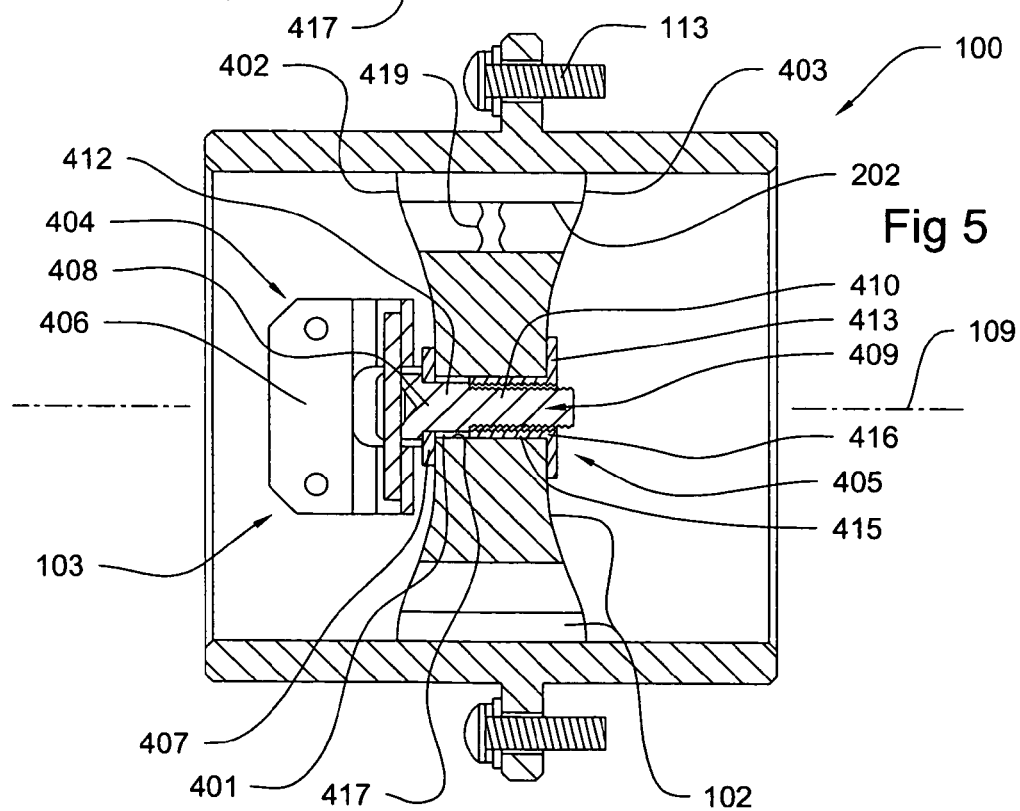

CABLE STUFFING TUBE

BACKGROUND OF THE INVENTION

1. Statement of the Technical Field

The inventive arrangements generally relate to a cable stuffing tube. In particular, the invention relates to an improved multi-cable stuffing tube assembly.

2. Description of the Related Art

Communication system devices often require the use of stuffing tubes where cables are extended through bulkheads. Conventional stuffing tubes typically contain an asbestos or other polymer composition seal that is wrapped around the cable to create an airtight seal around the cable. Various machined parts are used to compress the seal so as to substantially prevent air flow from one side of the bulkhead to the other. Air flow prevention is usually needed to meet equipment specifications.

Considering that electrical cables come in many different diameters, a comparable number of sizes of tubular bodies has been necessary for conventional stuffing tubes. The current state of the art consists of Heyco® fittings, customized bulkhead panels with panel mount connectors, and even empty stuffing tubes packed with putty or rubber corking. In view of this large variety of sizes and types of tubular bodies and panel mount connectors, the inventory costs to maintain such variety of wire protection devices increases. In addition, this variety also makes such installations even more complex.

A further problem arises in the context of military vehicle or shelter overhauling and refurbishing. This problem relates to changes in the size of electrical cables. For example, cables are sometimes reduced in size due to the different electrical requirements of modern electronic equipment. This has meant that the old tubular bodies, which have been previously welded into place, have had to be cut out of the bulkheads and replaced with new and different sized tubular bodies. Again, the cost has been very high and the time required has been excessive. Many prior stuffing tube installations also have a tendency to leak, requiring a great deal of time and expense in reworking to make them substantially airtight in accordance with equipment specifications.

Aside from changing the size of electrical cables, cable routing assignments may require changing the number of cables that are employed. Changing the number of cables has sometimes meant that additional bulkhead holes must be created and additional stuffing tubes must be welded into place. Currently, most NATO and ex-Soviet armored vehicle antenna feed-thru hole patterns, which number in the millions, are potentially affected by cable rework upgrades.

To compound the difficulties in rearranging cable routes, the cables that pass through the stuffing tubes must typically have their connectors removed before inserting or removing the cables from their respective stuffing tubes. Cable connectors often have a diameter that is considerably larger than the cable to which they are attached. The cable stuffing tube often will not accommodate the larger connector. Accordingly, the connectors must be removed before the cable is passed through a bulkhead. This rework task is also very time consuming. On average, the rework time per cable per vehicle takes about 1-2 hours. The problem is compounded when such reworking occurs in an uncontrolled environment such as in a combat zone, where the conditions may not offer the best probability for quality workmanship.

Therefore, what is needed is a cable stuffing tube design that can accommodate greater adaptability in cable reworking. Such a design should accommodate cables of varying sizes and quantities. In addition, the design should facilitate the reworking of cables without having to remove and resolder their connector ends.

SUMMARY OF THE INVENTION

The present invention concerns a stuffing tube for traversing a bulkhead with a cable and method for doing the same. The cable stuffing tube can accommodate several types of cables, such as power cables, RF communication cables, and data cables. The stuffing tube can also accommodate a plurality of cables of different shapes and cross-sectional areas. The cable stuffing tube comprises a rigid peripheral wall that can enclose an internal area. The rigid peripheral wall can further comprise a flange that outwardly extends from an outer surface of the rigid peripheral wall. A core can be formed of a resilient material that can be disposed within the internal area. The core can have a first and second opposing faces that are spaced apart. The cable stuffing tube can include one or more cable bores that can each have different cross-sectional profiles.

The invention can further include a compression device. The compression device can be at least partially disposed within a control bore of the core. The compression device can selectively vary an application of a compressive force to the resilient material. The compression device can further comprise a system of opposing flanges that are separated by the core. The flanges outwardly extend from a longitudinal axis of the compression device.

The invention can further include at least a first cable bore. The cable bore can be exclusive of the control bore formed in the core. The first cable bore can extend between the first and the second opposing faces. The compressive force can produce a dimensional variation in a cross-sectional profile of the first cable bore. According to one alternative, a pierceable cable bore membrane can be disposed within and transverse to a longitudinal axis of the first cable bore. According to another alternative of the invention, the first cable bore can have a cross-sectional profile that is substantially circular in shape.

A gap can be formed along a peripheral wall that defines the first cable bore. The gap can extend generally in a direction between the first and second opposing faces. A gap width can be variable responsive to the compressive force. In particular, the compressive force can produce a reduction in the gap width, as well as a reduction in the cross-sectional area of the first cable bore.

According to yet another embodiment, the stuffing tube can be comprised of a resilient material that is positioned between two opposing flanges. The cable stuffing tube can further include a rigid peripheral wall that is formed around an outer surface of the resilient material. A first cable bore can define an opening that extends through the resilient material. A compression device can include a system of opposing flanges. The compression device can selectively apply a compressive force to the resilient material by varying the distance between the opposing flanges. The compressive force can vary a cross-sectional profile of the first cable bore to engage a peripheral portion of a cable where it passes through the first cable bore. Moreover, a seal can be formed between an interior wall of the first cable bore and a periphery of the cable.

The cross-sectional profile of the first cable bore can be designed to accommodate a particular size cable. In addition, the cross-sectional profile can be selected to be larger than a standard cable end connector for the selected cable when there is no compressive force being applied to the resilient material. The invention can further include a gap having a predetermined width defined along a wall of the first cable bore. The gap can be variable responsive to the compressive force. According to another embodiment, the cable stuffing tube can include a pierceable membrane within the first cable bore. One or more cables can be positioned within one or more cable bores extending through the resilient material. The second cable bore can have a different cross-sectional profile as compared to the first cable bore. The compression device can concurrently vary a cross-sectional profile of each cable bore. The cable bore can be responsive to the compressive force to engage a peripheral portion of each cable where the cable passes through the cable bore.

BRIEF DESCRIPTION OF THE DRAWINGS

FIG. 4 is a cross-sectional view of FIG. 2 along the line 4-4 that shows the cable stuffing tube in its uncompressed position.

FIG. 5 is a cross-sectional view of FIG. 3 along the line 5-5 that shows the cable stuffing tube in its compressed position.

DETAILED DESCRIPTION OF THE PREFERRED EMBODIMENTS

Figure 1:
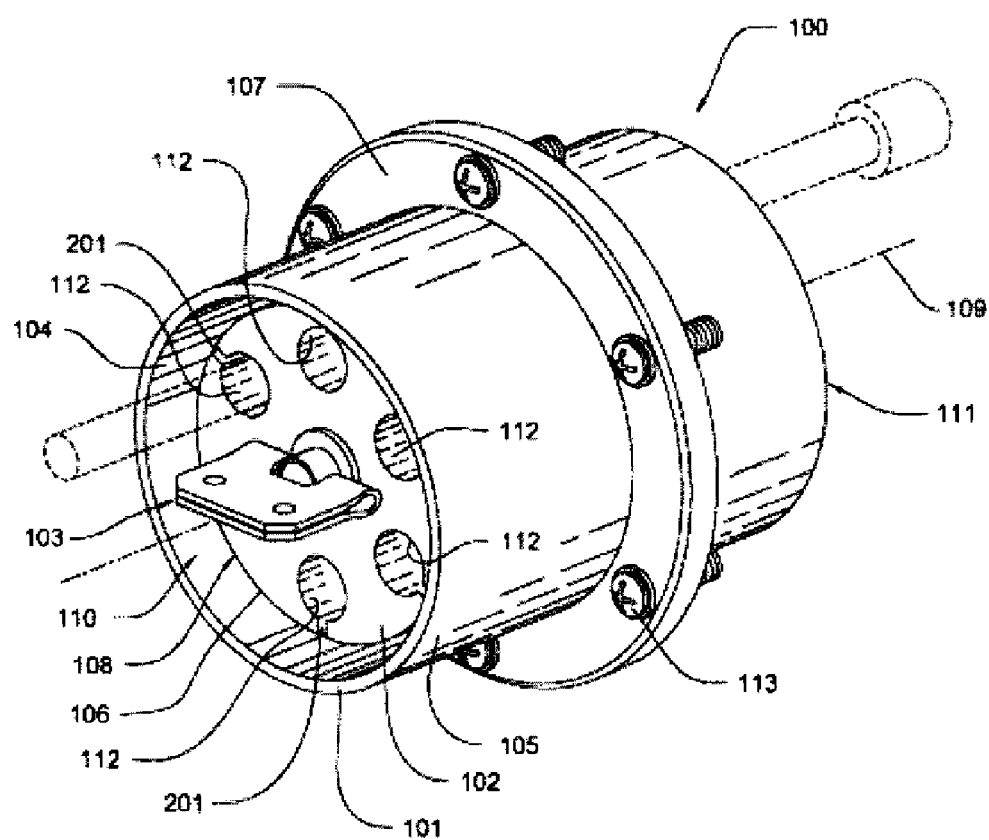
FIG. 1 is a perspective view of a cable stuffing tube that is useful for understanding the invention.

A stuffing tube assembly 100 shown in FIGS. 1-5 can include: a peripheral wall 101, a core 102, and a compression device 103. The peripheral wall 101 can at least partially enclose the core 102 as shown. The core 102 can be formed of a resilient material that is comprised of a system of bores. For example a control bore 401 and at least one cable bore 112 can be provided. The system of bores, 401 and 112 define an opening extending through the resilient material between a first and second face (402 and 403, respectively), of the core 102. Portions of the compression device 103 can be partially disposed within the control bore 401 of core 102. The compression device 103 can vary an application of a compressive force to the resilient material of the core 102.

The peripheral wall 101 can have any shape and can be comprised of an inner and outer surface (104 and 105, respectively). The outer surface 105 can be sized and shaped to fit a bulkhead opening of a vehicle or shelter. The inner surface 104 can be sized and shaped to accommodate the size and shape of the core 102, such that a seal can be formed between the inner surface 104 and surface portions of an outer periphery 106 of the core 102. The peripheral wall 101 can include a flange 107 that extends outwardly from the outer surface 105 thereon. The flange 107 can be configured for securing the stuffing tube assembly 100 to the bulkhead. Moreover, the flange 107 can form a seal when secured to the bulkhead. In FIGS. 1-5, a plurality of screws 113 can be used to secure the stuffing tube assembly to the bulkhead by passing the screws 113 through holes bored on the flange 107. However, the invention is not limited in this regard. Other ways to secure the stuffing tube assembly can include soldering the flange to the bulkhead, or employing other fastening methods.

In FIG. 1, the peripheral wall 101 is shown to be substantially cylindrical in shape, although it should be understood that the invention is not limited in this regard. For example, other shapes for the peripheral wall 101 can include tubular or parallelepiped shapes. The size and shape of the peripheral wall 101 is designed to enclose an internal area 108 defined by the size and shape of the core 102. The internal area 108 can include a longitudinal axis 109 that extends perpendicularly to an exterior and interior cross-sectional opening (110 and 111, respectively). The inner surface 104 is shown in FIG. 1 to be cylindrical and smooth, in accordance with the smooth surface portions of the outer periphery 106 of the cylindrical core 102. However, the invention is not limited in this regard and may include other types of surface types, so long as a seal is formed between inner surface 104 and surface portions of an outer periphery 106 of the core 102.

The peripheral wall 101 can be formed of a rigid material in order to limit the deformation of the core 102. There are several reasons for forming the peripheral wall of a rigid material. The inner surface 104 of the peripheral wall 101 should be rigid so as to provide a counteracting force directed against the varying compression force that causes the resilient material to push against the inner surface 104 of the peripheral wall 101. In addition, the rigidness of the peripheral wall helps to maintain the aforementioned seals. The flange 107 can also be formed of a rigid material so as to securely mount the peripheral wall 101 to the bulkhead. Moreover, both the peripheral wall 101 and the flange 107 can be formed of a corrosion-resistant material to weather any harsh environmental conditions. Examples of rigid and/or corrosion-resistant materials include, but are not limited to, iron, aluminum, nickel, copper, and alloys thereof such as stainless steel and brass.

The core 102 can be disposed within the internal area 108 formed by the inner surface 104 of the peripheral wall 101. The length of the core 102 can extend in a direction defined by the longitudinal axis 109. The core 102 can be sized and shaped to fit within the internal area 108, such that a seal can be formed between the inner surface 104 and the surface portions of the outer periphery 106 of the core 102. In view of the foregoing, any number of core shapes and can be used. Such core shapes include, but are not limited to cylindrical, tubular, and parallelepiped shapes. FIG. 1 shows a circular cross-sectional area of a cylindrically shaped core 102. However, the invention is not limited in this regard. Other shapes can be used so long as the core 102 can securely fit within the internal area 108 defined by the peripheral wall 101, and a seal can be formed between the inner surface 104 and the surface portions of the outer periphery 106 of the core 102. The core 102 can be formed of any suitable resilient material. Examples of such resilient material can include, but are not limited to, rubber/elastomer types such as polyurethane rubber, buna rubber, Viton® rubber, neoprene™, EPDM rubber, silicone RTV, fluorosilicone rubber, and other polymer materials.

Figure 2:
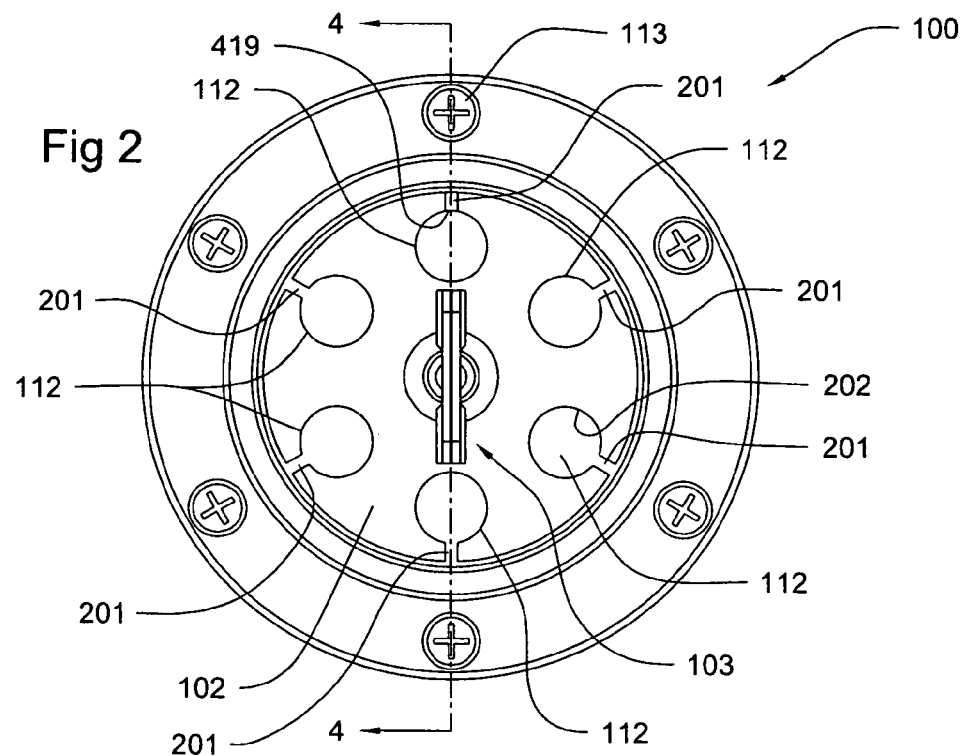
FIG. 2 is a front view of the cable stuffing tube that shows the cable stuffing tube in its uncompressed position.
Figure 3:
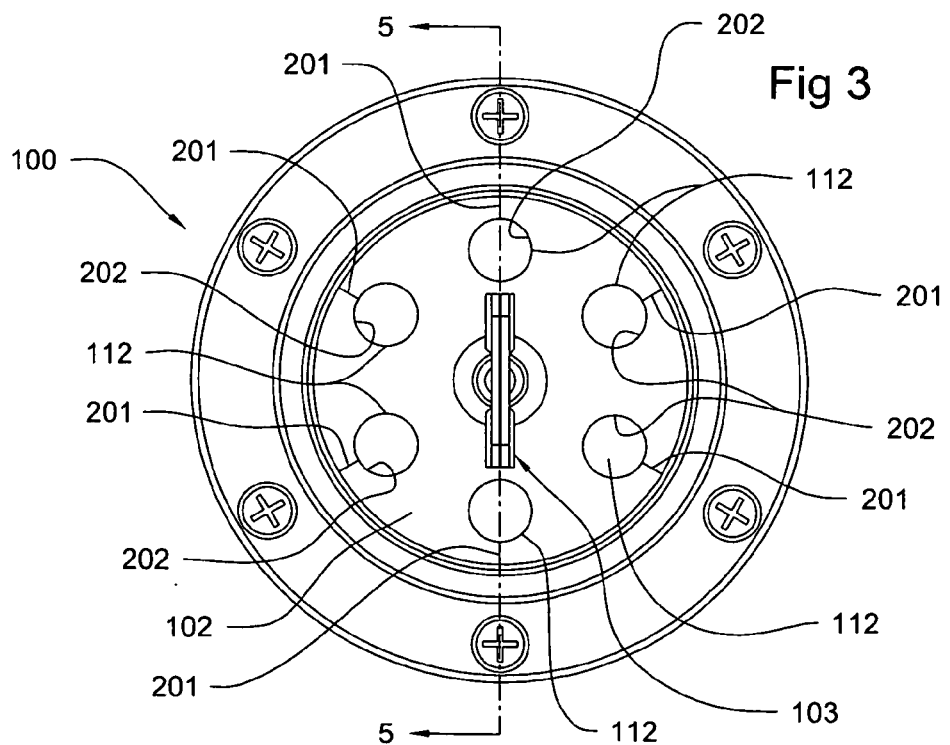
FIG. 3 is a front view of the cable stuffing tube that shows the cable stuffing tube in its compressed position.

Referring to FIGS. 2 and 4, a system of bores (401 and 112) can be formed through the core 102 and can be aligned with the longitudinal axis 109. One such type of bore, a control bore 401, can be designed to accommodate portions of the compression device 103 disposed therein. Another type of bore, a cable bore 112, can be designed to accommodate portions of a particular size cable extending between the first and second opposing faces (402 and 403, respectively) of the core 102. The cross-sectional profile areas of both the control bore 401 and the cable bore 112 can be of any shape, and are not limited to circular cross-sections as shown in the FIGS. 1, 2, and 4. Examples can include elliptical and polygonal cross-sectional shapes. A gap 201 can be formed along a peripheral wall of a cable bore 202 and can extend parallel to the longitudinal axis 109. The width of the gap 201 can vary depending upon the compressive force intended to be applied to the core 102 by the compression device 103, and the amount of variation desired in the cross-sectional profile area defined by the cable bore 112.

When the core 102 is in an uncompressed position, as shown in FIGS. 2 and 4, the width of the gap 201 and the cross-sectional profile area of the cable bore 112 can both be at a maximum. This cross-sectional profile area can be selected to be larger than a standard cable connector for the cable. This allows a particular size cable to pass through the cable bore 112 without having to remove its cable connector. However, when the core 102 is in a compressed position, as shown in FIGS. 4 and 5, the width of the gap 201 and the cross-sectional profile area of the cable bore 112 can be reduced responsive to the compressive force being applied to the core 102. As this narrowing occurs, a seal is formed between the peripheral wall of the cable bore 202 and a peripheral surface portion of the cable. In order to form the aforementioned seal, the width of the gap 201 must close completely.

Although the cable bores 112 shown in FIGS. 1-5 show identical cross-sectional profile areas to accommodate cables of equal sizes, the invention is not limited in this regard. The stuffing tube assembly 100 can be adapted to accommodate one or more cables having different cross-sectional areas. This can be achieved by forming one or more cable bores 112 with different respective cross-sectional profile shapes and sizes. In addition, the relative placement of the control and cable bores represented in FIGS. 1-5 need not be placed in such an arrangement. For example, the control bore 401 is not required to be centrally placed, and can be positioned in other areas of the core 102. Moreover, the cable bores 112 do not have to be evenly spaced around the periphery of the control bore as is shown in FIGS. 1-5. Instead, a wide variety of bore placement configurations are possible without affecting the functionality of the invention.

According to one embodiment, a pierceable membrane 419 can be disposed within one or more cable bores 112 when the particular cable bores are not used. Moreover, the pierceable membrane 419 can be disposed transverse to a longitudinal axis of the first cable bore that is aligned with the longitudinal axis 109. The membrane 419 can be formed from a resilient material similar to the resilient material used to form the core 102. Such resilient material can include, but is not limited to, rubber/elastomer types such as polyurethane rubber, buna rubber, Viton® rubber, neoprene™, EPDM rubber, silicone RTV, fluorosilicone rubber, and other polymer materials. The membrane 419 can be designed to form a seal around the peripheral wall 304 of the cable bore 112. When the particular cable bore 112 is ready for use, the membrane 419 can be pierced to allow a cable with its corresponding cable end connector to extend through the cable bore 112. It should also be understood that in order for a cable and its connector to pass through a membrane-pierced cable bore 112, the core 102 should remain in an uncompressed position.

Referring to FIGS. 4 and 5, the compression device 103 is shown in an uncompressed position and a compressed position, respectively. In the embodiment shown, the compression device 103 includes a thumbscrew 404 and a receiving member 405. The thumbscrew 404 can be further comprised of a key handle 406, a thumbscrew flange 407, a thumbscrew cylinder 410, a thumbscrew unthreaded portion 408, and a thumbscrew threaded portion 409. The key handle 406 can be mechanically coupled to the thumbscrew unthreaded portion 408, which is in turn coupled to both the thumbscrew flange 407 and the thumbscrew threaded portion 409. The thumbscrew flange 407 can extend outwardly from the thumbscrew unthreaded portion 408 that is aligned with the longitudinal axis 109. Moreover, the thumbscrew flange 407 can be disposed on a portion of the first face 402 of the core 102. The thumbscrew threaded portion 409 can be partially disposed within the control bore 401.

The receiving member 405 can be further comprised of a flanged end 413 and a threaded receiving cylinder 414 that threadingly engages the thumbscrew threaded portion 409. The flanged end 413 of the receiving member 405 can extend outwardly from the threaded receiving cylinder 414 that is aligned with the longitudinal axis 109. The flanged end 413 of the receiving member 405 can be disposed on the second face 403 of the core 102. The flanged end 413 of the receiving member 405 and the thumbscrew flange 407 can form a system of opposing flanges separated by the core 102. The threaded receiving cylinder 414 can be at least partially disposed within the control bore 401. The threaded receiving cylinder 414 of the receiving member 405 can be further comprised of an outer cylindrical surface 415 and a threaded inner surface 416. The outer cylindrical surface 415 can be smooth and have a circular cross-sectional profile. However, the invention is not limited in this regard. An alternative cross-sectional profile to the outer cylindrical surface 415 can be that of a star-shaped cross-sectional profile. The star-shaped outer surface can be interlockingly mated with a peripheral wall of the control bore 417 having a star-shaped cross-sectional profile. This alternative can avoid any rotation of the receiving member 405 when engaged with the thumbscrew 404. It should be noted, however, that the structure of the compression device 103 is not limited to what is shown in FIGS. 1-5. For example, the compression device 103 may instead be comprised of an internally threaded thumbscrew cylinder that can threadingly engage an externally threaded receiving cylinder.

Upon rotation of the key handle 406 of the thumbscrew 404 and relative advancement by the thumbscrew threaded portion 409, the core 102 can be compressed using the system of opposing flanges (407, 413) disposed on opposing faces of the core 102. As the thumbscrew threaded portion engages the threaded receiving cylinder 414, the opposing flanges (407, 413) move toward each other. As the core 102 is compressed by its interaction with the opposing flanges and the rigid inner surface 104 of the peripheral wall 101, the resilient material becomes distorted. This distortion results in the narrowing of the gap 201 and cross-sectional profile area of the cable bore 112. In order to form a form a seal around the peripheral portion of the cable disposed within the cable bore 112, the gap 201 must close completely during the compression of the core 102

While the specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A method for traversing a bulkhead with a cable, comprising:
   positioning a resilient material between two opposing flanges;
   providing a single threaded compression screw aligned with a central axis of said resilient material extending from a first one of said opposing flanges, through a control bore defined in said resilient material, to a threaded member secured to a second one of said two opposing flanges;

passing a cable through a first cable bore of a plurality of cable bores radially disposed at least a first radial distance around said control bore, and extending through said resilient material;

selectively applying a compressive force to only a limited portion of said resilient material extending from said central axis a distance less than said first radial distance by exclusively rotating said compression screw in said threaded member to vary a distance between said opposing flanges;

varying a cross-sectional profile of each of said plurality of cable bores, including said first cable bore responsive to said compressive force to engage a peripheral portion of said cable where it passes through said first cable bore.

2. The method according to claim 1, further comprising forming with a wall of said first cable bore a seal around a periphery of said cable where said cable passes through said first cable bore.

3. The method according to claim 1, further comprising, positioning said resilient material in an opening in a wall defined by a bulkhead.

4. The method according to claim 1, wherein said passing step further comprises passing through said first cable bore a cable connector attached to an end of said cable.

5. The method according to claim 4, further comprising forming a seal around a periphery of said cable where said cable passes through said first cable bore, after said cable connector has been passed through said first cable bore.

6. The method according to claim 1, further comprising, varying a width of a gap defined in a wall of said first cable bore responsive to said compressive force.

7. The method according to claim 1, further comprising, prior to said passing step, piercing a membrane within said first cable bore.

8. The method according to claim 1, further comprising passing at least a second cable through a second cable bore extending through said resilient material.

9. The method according to claim 8, further comprising selecting said second cable bore to have a different cross-sectional profile as compared to said first cable bore.

10. The method according to claim 8, further comprising concurrently varying a cross-sectional profile of each said cable bore responsive to said compressive force to engage a peripheral portion of each said cable where it passes through said cable bore.

11. A stuffing lube for traversing a bulkhead with a cable, comprising:
a resilient material positioned between two opposing flanges each extending radially a first distance from a control bore defined in said resilient material;
a single threaded compression screw aligned with a central axis of said resilient material extending from a first one of said two opposing flanges, through said control bore, to a threaded member secured to a second one of said two opposing flanges;
a plurality of cable bores aligned with and radially disposed around said control bore a second distance greater than said first distance, including at least a first cable bore defining an opening extending through said resilient material;
wherein said single threaded compression screw, said two opposing flanges, and said threaded member form a compression device configured for selectively applying a compressive force to said resilient material within a radial area designed by said first distance by varying a third distance between said two opposing flanges and said compressive force varies a cross-sectional profile of each of said plurality of cable bores, including said first cable bore to engage a peripheral portion of a cable where it passes through said first cable bore.

12. The cable stuffing tube according to claim 11, wherein said cable is selected from the group consisting of a power cable, an RF communication cable, and a data cable.

13. The cable stuffing tube according to claim 11, further comprising a seal formed between an interior wall of said first cable bore and a periphery of said cable.

14. The cable stuffing tube according to claim 11, further comprising a rigid peripheral wall formed around an outer surface of said resilient material.

15. The cable stuffing lube according to claim 11, further comprising a gap having a predetermined width defined along a wall of said first cable bore.

16. The cable stuffing tube according to claim 15, wherein a width of said gap is variable responsive to said compressive force.

17. The cable stuffing tube according to claim 11, further comprising, a pierceable membrane within said first cable bore.

18. The cable stuffing tube according to claim 11, further comprising at least a second cable positioned within at least a second cable bore extending through said resilient material.

19. The cable stuffing tube according to claim 18, wherein said second cable bore has a different cross-sectional profile as compared to said first cable bore.

20. The cable stuffing tube according to claim 18, wherein said compression device concurrently varies a cross-sectional profile of each said cable bore responsive to said compressive force to engage a peripheral portion of each said cable where it passes through said cable bore.

21. A stuffing tube for traversing a bulkhead with a cable, comprising:
a resilient material positioned between two opposing flanges;
a single threaded compression screw aligned with a central axis of said resilient material extending from a first one of said two opposing flanges, through a control bore defined in said resilient material, to a threaded member secured to a second one of said two opposing flanges;
a plurality of cable bores aligned with and radially disposed around said control bore, including a first cable bore defining an opening extending through said resilient material;
wherein said single threaded compression screw, said two opposing flanges, and said threaded member form a compression device configured for selectively applying a compressive force to said resilient material by varying a distance between said two opposing flanges and
said compressive force varies a cross-sectional profile of each of said plurality of cable bores, including said first cable bore to engage a peripheral portion of a cable where it passes through said first cable bore, and
wherein said cross-sectional profile of said first cable bore is designed to accommodate a particular size cable, and said cross-sectional profile is selected to be larger than a standard cable connector for said cable disposed on an end of said cable when said compressive force is not applied to said resilient material.

22. A stuffing tube comprising:
a rigid peripheral wall enclosing an internal area;
a core formed of a resilient material disposed within said internal area, said core having first and second opposing faces spaced apart along said core;

a compression device comprising a first and second flange respectively disposed on said first and second opposing faces, a single threaded compression screw aligned with a central axis of said resilient material extending from said first flange, through a control bore defined in said resilient material, to a threaded member secured to said second flange, said compression device configured for selectively varying an application of a compressive force to a portion of said resilient material responsive to a rotation of said single threaded compression screw within said threaded member;

a plurality of cable bores radially disposed around said control bore and at a first radial distance from said control bore, including at least a first cable bore, said first cable bore extending along a longitudinal axis between said first and said second opposing faces;

a pierceable membrane disposed in at least said first cable bore between said first and said second opposing faces, said pierceable membrane extending over a cross-section of said first cable bore transverse to said first longitudinal axis;

wherein said first and said second flanges extend radially from said control bore a second distance less than said first distance, wherein said portion of said resilient material is within a radial defined by said second distance, and wherein said compressive force produces a dimensional variation in a cross-sectional profile of said first cable bore.

23. The stuffing tube according to claim 22, wherein said rigid peripheral wall further comprises a flange outwardly extending from an outer surface of said rigid peripheral wall.

24. The stuffing tube according to claim 22, wherein a profile of said cross-section of said first cable bore is substantially circular.

25. The stuffing tube according to claim 22, wherein a gap is formed along a peripheral wall defining said first cable bore and extends generally in a direction between said first and second faces.

26. The stuffing tube according to claim 25, wherein a width of said gap is variable responsive to said compressive force.

27. The stuffing tube according to claim 26, wherein said width of said gap is reduced responsive to said compressive force.

28. The stuffing tube according to claim 22, wherein a cross-sectional area of said first cable bore is reduced responsive to said compressive force.

29. The stuffing tube according to claim 22, wherein said first and said second flanges outwardly extend from a longitudinal axis of said compression device.

30. The stuffing tube according to claim 22, wherein said plurality of cable bores further comprises at least a second cable bore.

31. The stuffing tube according to claim 30 wherein said second cable bore has a cross-sectional profile that is different from said first cable bore.

* * * * *